(12) United States Patent
Maruyama et al.

(10) Patent No.: US 11,555,917 B2
(45) Date of Patent: Jan. 17, 2023

(54) RADAR DEVICE

(71) Applicant: Mitsubishi Electric Corporation, Chiyoda-ku (JP)

(72) Inventors: Takashi Maruyama, Tokyo (JP); Masanori Ito, Tokyo (JP); Michiaki Kasahara, Tokyo (JP); Shigeo Udagawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 798 days.

(21) Appl. No.: 16/342,828

(22) PCT Filed: Dec. 26, 2016

(86) PCT No.: PCT/JP2016/088732
§ 371 (c)(1),
(2) Date: Apr. 17, 2019

(87) PCT Pub. No.: WO2018/122926
PCT Pub. Date: Jul. 5, 2018

(65) Prior Publication Data
US 2019/0302254 A1 Oct. 3, 2019

(51) Int. Cl.
*G01S 13/93* (2020.01)
*H01Q 1/22* (2006.01)
(Continued)

(52) U.S. Cl.
CPC .............. *G01S 13/93* (2013.01); *H01Q 1/22* (2013.01); *H01Q 1/32* (2013.01); *H01Q 13/08* (2013.01); *H01Q 21/061* (2013.01); *H01Q 21/08* (2013.01)

(58) Field of Classification Search
CPC ........ G01S 13/93; G01S 13/931; G01S 13/42; H01Q 1/22; H01Q 1/32; H01Q 13/08;
(Continued)

(56) References Cited

U.S. PATENT DOCUMENTS 5,682,168 A * 10/1997 James .................. H01Q 1/3275
343/810
6,137,434 A * 10/2000 Tohya ...................... H01Q 1/38
342/175
(Continued)

FOREIGN PATENT DOCUMENTS

JP 10-287180 A 10/1998
JP 2003-115713 A 4/2003
(Continued)

OTHER PUBLICATIONS

International Search Report dated Mar. 21, 2017 in PCT/JP2016/088732 filed Dec. 12, 2016.

*Primary Examiner* — Bernarr E Gregory
*Assistant Examiner* — Yonghong Li
(74) *Attorney, Agent, or Firm* — Oblon, McClelland, Maier & Neustadt, L.L.P.

(57) ABSTRACT

A radar device includes a transmission antenna and a reception antenna that is a structure different from the transmission antenna. The transmission antenna includes a single or a plurality of transmission element antennae and a transmission dielectric substrate where the single or the plurality of transmission element antennae is positioned, and a length in a first direction of the transmission antenna is longer than a length in a second direction of the transmission antenna, and the second direction is orthogonal to the first direction. The reception antenna includes a single or a plurality of reception element antennae and a reception dielectric substrate where the single or the plurality of reception element antennae is positioned, a length in a third direction of the reception antenna is longer than a length in a fourth direction of the reception antenna, and the fourth direction is orthogonal to the third direction.

8 Claims, 12 Drawing Sheets

(51) Int. Cl.
*H01Q 1/32* (2006.01)
*H01Q 13/08* (2006.01)
*H01Q 21/06* (2006.01)
*H01Q 21/08* (2006.01)

(58) Field of Classification Search
CPC .... H01Q 21/061; H01Q 21/08; H01Q 1/3233; H01Q 21/065
See application file for complete search history.

(56) References Cited

U.S. PATENT DOCUMENTS

| | | |
|---|---|---|
| 8,604,968 B2 * | 12/2013 | Alland ................ B60R 1/00 342/22 |
| 2004/0196179 A1 * | 10/2004 | Turnbull ............. G01S 5/0221 343/711 |
| 2009/0079648 A1 | 3/2009 | Matsuo et al. |
| 2015/0061921 A1 | 3/2015 | Ding et al. |
| 2016/0291146 A1 * | 10/2016 | Wang .................. G01S 13/867 |

FOREIGN PATENT DOCUMENTS

| | | |
|---|---|---|
| JP | 2003-344535 A | 12/2003 |
| JP | 4394147 B2 | 1/2010 |
| JP | 2015-154327 A | 8/2015 |
| JP | 2016-102801 A | 6/2016 |

* cited by examiner

HORIZONTAL PLANE

VERTICAL PLANE

HORIZONTAL PLANE

VERTICAL PLANE

RADAR DEVICE

FIELD

The present invention relates to a radar device arranged in an automobile so as to prevent the automobile from colliding with a target and an antenna arrangement method of arranging an antenna included in the radar device in the automobile.

BACKGROUND

Conventionally, to prevent collision of an automobile with a target, a radar device including a transmission antenna and a reception antenna is arranged in the automobile. An example of the target is an automobile which travels on the front side of the automobile in a case where the automobile in which the radar device is arranged travels or an obstacle positioned on the front side of the automobile in a case where the automobile in which the radar device is arranged travels. The transmission antenna emits a radio wave, and the reception antenna receives a reflected wave from the target. A distance from the automobile to the target is obtained based on a time from a time when the transmission antenna emits the radio wave to a time when the reception antenna receives the reflected wave. A radar device having a square antenna surface has been proposed (for example, refer to Patent Literature 1).

CITATION LIST

Patent Literature

Patent Literature 1: Japanese Patent No. 4394147

SUMMARY

Technical Problem

However, since a conventional radar device has a square antenna surface and is relatively large, the conventional radar device can be arranged only in a limited place on the front side of the automobile. An example of the limited place is a hood.

The present invention has been made in consideration of the above, and an object of the present invention is to obtain a radar device that does not limit a place in an automobile to be arranged.

Solution to Problem

To solve the above problems and to achieve the object, the present invention includes a transmission antenna and a reception antenna which is a structure different from the transmission antenna. The transmission antenna includes a single or a plurality of transmission element antennae and a transmission dielectric substrate where the single or the plurality of transmission element antennae is positioned, and a length in a first direction of the transmission antenna is longer than a length in a second direction of the transmission antenna, and the second direction is orthogonal to the first direction. The reception antenna includes a single or a plurality of reception element antennae and a reception dielectric substrate where the single or the plurality of reception element antennae is positioned, a length in a third direction of the reception antenna is longer than a length in a fourth direction of the reception antenna, and the fourth direction is orthogonal to the third direction.

Advantageous Effects of Invention

A radar device according to the present invention has an effect that a place of an automobile where the radar device is arranged is not limited.

DESCRIPTION OF EMBODIMENTS

Hereinafter, a radar device and an antenna arrangement method according to embodiments of the present invention will be described in detail with reference to the drawings. The present invention is not limited to the embodiments.

First Embodiment

Figure 1:
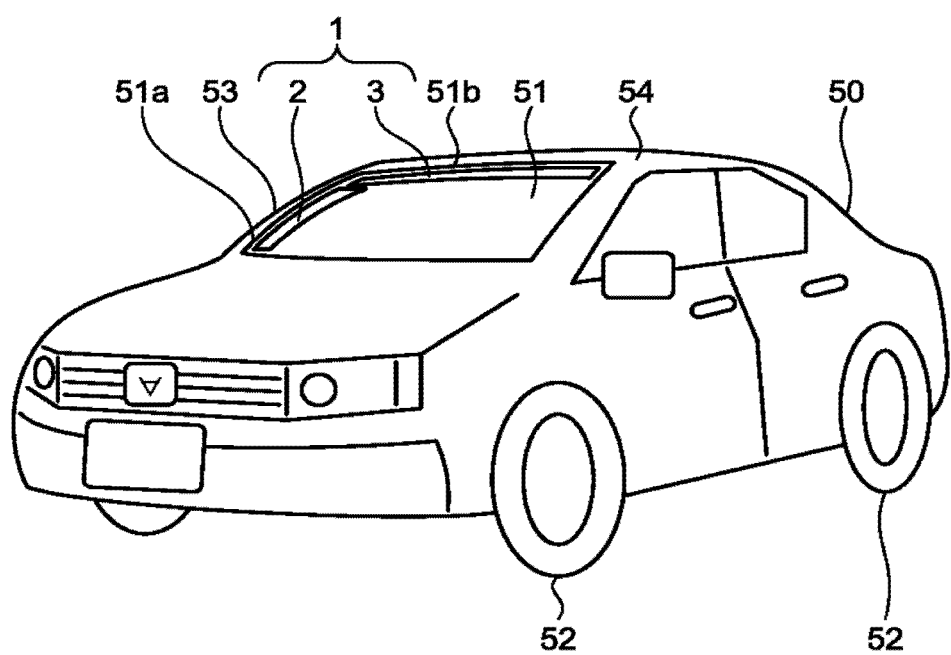
FIG. 1 is a diagram illustrating an example of a state where a radar device according to a first embodiment is arranged in an automobile.

FIG. 1 is a diagram illustrating an example of a state where a radar device 1 according to a first embodiment is arranged in an automobile 50. As illustrated in FIG. 1, the radar device 1 includes a transmission antenna 2 and a reception antenna 3 which is a structure different from the transmission antenna 2. FIG. 1 illustrates a state where the transmission antenna 2 and the reception antenna 3 included in the radar device 1 are arranged on a windshield 51 of the automobile 50. The transmission antenna 2 is an antenna having a longitudinal direction and a short direction. The reception antenna 3 is an antenna having a longitudinal direction and a short direction.

Figure 2:
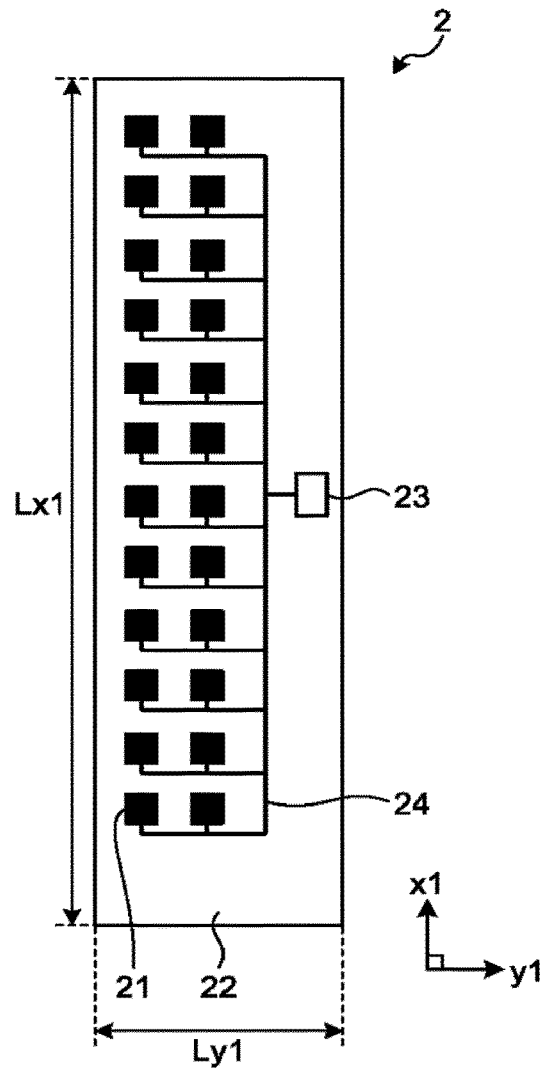
FIG. 2 is a plan view of a transmission antenna included in the radar device according to the first embodiment.

FIG. 2 is a plan view of the transmission antenna 2 included in the radar device 1 according to the first embodiment. The transmission antenna 2 includes a plurality of transmission element antennae 21 and a transmission dielectric substrate 22 where the plurality of transmission element antennae 21 is positioned. The plurality of transmission element antennae 21 is arranged on one of two planes of the transmission dielectric substrate 22 to be positioned on the transmission dielectric substrate 22. Each of the plurality of transmission element antennae 21 is a patch antenna.

A shape of the plane of the transmission dielectric substrate 22 is a rectangle of which a length Lx1 in a first direction x1 is longer than a length Ly1 in a second direction y1. The second direction y1 is orthogonal to the first direction x1. That is, the length Lx1 in the first direction x1 of the transmission antenna 2 is longer than the length Ly1 in the second direction y1 of the transmission antenna 2. As illustrated in FIG. 2, in the first embodiment, the plurality of transmission element antennae 21 is arranged in two lines on a rectangular plane of the transmission dielectric substrate 22.

The length Lx1 in the first direction x1 of the transmission antenna 2 is, for example, several 10 mm to several 100 mm. The length Ly1 in the second direction y1 of the transmission antenna 2 is, for example, several mm to several 10 mm.

The transmission antenna 2 further includes a feeding unit 23 that outputs a high-frequency signal and a line 24 that connects the feeding unit 23 to each of the plurality of transmission element antennae 21. The line 24 is a microstrip line. The high-frequency signal output from the feeding unit 23 is received by each of the plurality of transmission element antennae 21 via the line 24. Each of the plurality of transmission element antennae 21 emits a radio wave corresponding to the high-frequency signal output from the feeding unit 23.

The feeding unit 23 may be a high frequency circuit. In a case where the high frequency circuit is arranged on the other surface of the transmission dielectric substrate 22, the feeding unit 23 may be a converter that transmits a signal output from the high frequency circuit arranged on the other surface to each of the plurality of transmission element antennae 21. The other surface of the transmission dielectric substrate 22 is a surface of two planes of the transmission dielectric substrate 22 where the plurality of transmission element antennae 21 is not arranged.

Each of the plurality of transmission element antennae 21 is not limited to a patch antenna. It is not necessary for the plurality of transmission element antennae 21 to be arranged in two lines on the plane of the transmission dielectric substrate 22. The plurality of transmission element antennae 21 may be replaced with a single transmission element antenna 21. The line 24 is not limited to a microstrip line.

Figure 3:
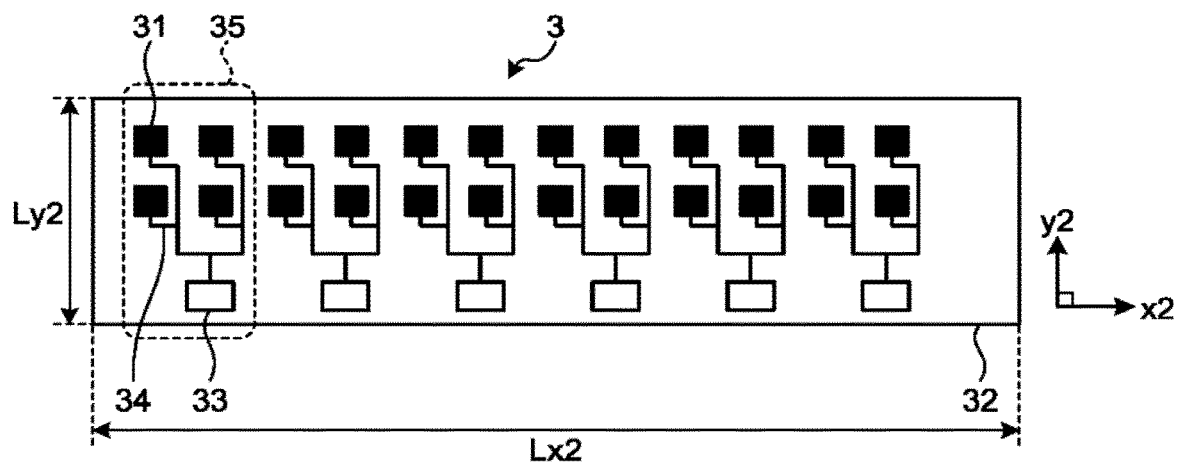
FIG. 3 is a plan view of a reception antenna included in the radar device according to the first embodiment.

FIG. 3 is a plan view of the reception antenna 3 included in the radar device 1 according to the first embodiment. The reception antenna 3 includes a plurality of reception element antennae 31 and a reception dielectric substrate 32 where the plurality of reception element antennae 31 is arranged. The plurality of reception element antennae 31 is arranged on one of two planes of the reception dielectric substrate 32 to be positioned on the reception dielectric substrate 32. Each of the plurality of reception element antennae 31 is a patch antenna.

A shape of the plane of the reception dielectric substrate 32 is a rectangle of which a length Lx2 in a third direction x2 is longer than a length Ly2 in a fourth direction y2. The fourth direction y2 is orthogonal to the third direction x2. That is, length Lx2 in the third direction x2 of the reception antenna 3 is longer than the length Ly2 in the fourth direction y2 of the reception antenna 3. Each of the plurality of reception element antennae 31 receives a radio wave reflected by a target among the radio wave emitted from the plurality of transmission element antennae 21 of the transmission antenna 2.

The length Lx2 in the third direction x2 of the reception antenna 3 is, for example, several 10 mm to several 100 mm. The length Ly2 in the fourth direction y2 of the reception antenna 3 is, for example, several mm to several 10 mm.

The reception antenna 3 includes a plurality of reception units 33 that receives a signal based on the radio wave received by each of the plurality of reception element antennae 31. The reception antenna 3 further includes a line 34 that connects each of the plurality of reception units 33 to the plurality of reception element antennae 31. The line 34 is a microstrip line. A group 35 including a single reception unit 33 and the plurality of reception element antennae 31 connected to the single reception unit 33 with a part of the line 34 is defined as a unit of a single channel. In FIG. 3, the single group 35 is surrounded by a broken line. Since the reception antenna 3 includes the plurality of reception units 33, the reception antenna 3 has a plurality of channels.

A single straight line from the automobile 50 to the front side of the automobile 50 on one horizontal plane is defined as a reference line, and an intersection between the reference line and a foremost portion of the automobile 50 is defined as a reference point. To detect an angle formed by the line connecting the reference point and a position where the target exists and the reference line, the plurality of channels is provided in the reception antenna 3. An arrival angle difference of the radio waves can be detected by the plurality of channels, and the angle can be estimated from the detection result. Therefore, as described later, the reception antenna 3 is arranged in the automobile 50 so that a channel arrangement direction becomes the horizontal direction.

Each of the plurality of reception element antennae 31 is not limited to a patch antenna. A single channel may include the plurality of reception element antennae 31 or only the single reception element antenna 31. The reception antenna 3 may include only one channel without including the plurality of channels.

The reception unit 33 may be a high frequency circuit. In a case where the high frequency circuit is arranged on the other surface of the reception dielectric substrate 32, the reception unit 33 may be a high frequency circuit that transmits a signal to the high frequency circuit arranged on the other surface. The other surface of the reception dielectric substrate 32 is a surface of two planes of the reception dielectric substrate 32 where the reception element antenna 31 is not arranged. Each of the reception element antennae 31 is not limited to a patch antenna. The line 34 is not limited to a microstrip line.

Next, the antenna arrangement method according to the first embodiment will be described with reference to FIG. 1. Each of the transmission antenna 2 and the reception antenna 3 is arranged on the windshield 51 of the automobile 50 as illustrated in FIG. 1. The windshield 51 has four sides. Here, one of two sides, which are not parallel to the horizontal plane when tires 52 included in the automobile 50 have contact with the ground, of the four sides is defined as a first side 51a.

One of two sides, parallel to the horizontal plane when the tires 52 included in the automobile 50 have contact with the ground, of the four sides is defined as a second side 51b. The second side 51b is an upper side of the two sides parallel to the horizontal plane when the tires 52 have contact with the ground. The second side 51b is orthogonal to the first side 51a. Note that "orthogonal" does not mean strict orthogonality and means that the second side 51b is not parallel to the first side 51a.

The antenna arrangement method according to the first embodiment includes a first step of arranging the transmission antenna 2 along the first side 51a of the windshield 51 on the windshield 51 of the automobile 50 and a second step of arranging the reception antenna 3 along the second side 51b of the windshield 51. For example, the transmission antenna 2 and the reception antenna 3 are arranged on a surface of two surfaces of the windshield 51 closer to seats. In the first step, the first direction x1 of the transmission antenna 2 is parallel to the first side 51a. In the second step, the third direction x2 of the reception antenna 3 is parallel to the second side 51b.

An operation of the first step may be performed before an operation of the second step, may be performed after the operation of the second step, and may be performed simultaneously with the operation in the second step.

As described above with reference to FIG. 1, the transmission antenna 2 is arranged along the first side 51a of the windshield 51 of the automobile 50, and the reception antenna 3 is arranged along the second side 51b of the windshield 51. By adjusting the size of each of the transmission antenna 2 and the reception antenna 3, particularly by adjusting the length in the short direction of each of the transmission antenna 2 and the reception antenna 3, the transmission antenna 2 and the reception antenna 3 can be arranged at positions inconspicuous from inside and outside the automobile 50 or the positions almost invisible from the inside and the outside of the automobile 50. Therefore, the transmission antenna 2 and the reception antenna 3 do not interfere driving of a driver of the automobile 50.

Figure 4:
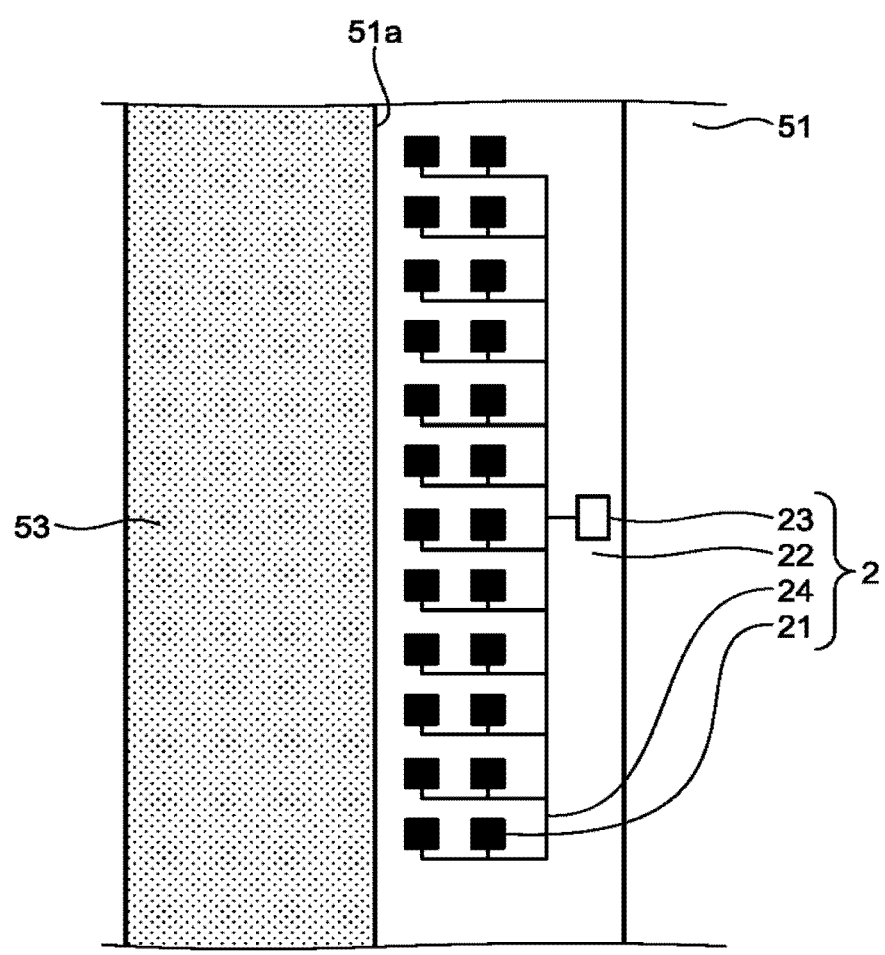
FIG. 4 is a diagram for explaining an operation of a first step of an antenna arrangement method according to the first embodiment.

The first step will be further described with reference to FIG. 4. FIG. 4 is a diagram for explaining the operation of the first step of the antenna arrangement method according to the first embodiment. FIG. 4 illustrates a situation in which the state where the transmission antenna 2 is arranged along the first side 51a of the windshield 51 as viewed from outside the automobile 50. As illustrated in FIG. 4, in the first step, the transmission antenna 2 is arranged along the first side 51a having contact with an A pillar 53 of the automobile 50, of the four sides of the windshield 51. The A pillar 53 is positioned at the foremost position from among structures holding a roof 54 of the automobile 50.

As described above, the antenna arrangement method according to the first embodiment includes the first step of arranging the transmission antenna 2 at a first portion of the automobile 50 and the second step of arranging the reception antenna 3 at a second portion of the automobile 50. The second portion is different from the first portion. In the example in FIG. 1, the first portion is a portion along the first side 51a of the windshield 51 of the automobile 50, and the second portion is a portion along the second side 51b of the windshield 51.

As described above, the length Lx1 in the first direction x1 of the transmission antenna 2 is longer than the length Ly1 in the second direction y1 of the transmission antenna 2. The length Lx2 in the third direction x2 of the reception antenna 3 is longer than the length Ly2 in the fourth direction y2 of the reception antenna 3. In a case where the high-frequency signal used by the radar device 1 is millimeter waves, the wavelength is relatively short. Therefore, the length Ly1 in the second direction y1 of the transmission antenna 2 can be designed to be about several mm to several 10 mm. Similarly, the length Ly2 in the fourth direction y2 of the reception antenna 3 can be designed to be about several mm to several 10 mm.

That is, the length in the short direction of each of the transmission antenna 2 and the reception antenna 3 can be designed to be about several mm to several 10 mm. Therefore, as described above, the transmission antenna 2 and the reception antenna 3 can be arranged at positions inconspicuous from inside and outside the automobile 50 or positions almost invisible from the inside and the outside the automobile 50.

Figure 5:
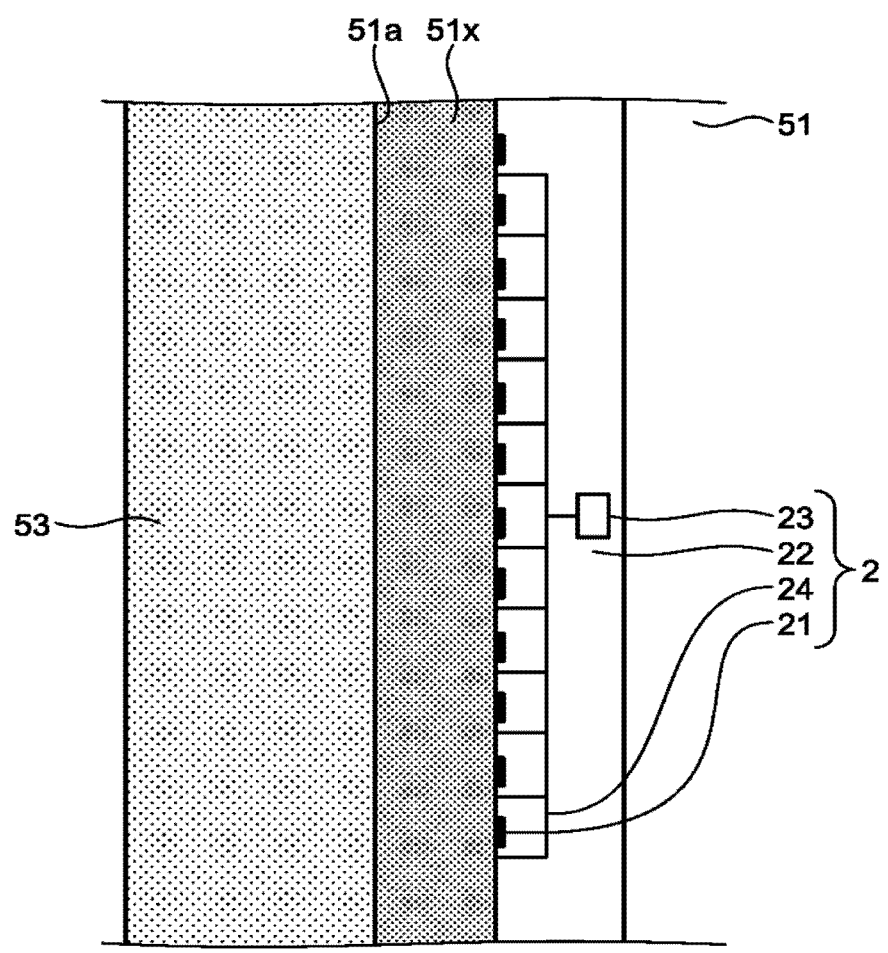
FIG. 5 is a diagram for explaining a modification of the operation of the first step of the antenna arrangement method according to the first embodiment.

The windshield 51 may include a first colored portion provided along the first side 51a and a second colored portion provided along the second side 51b. FIG. 5 is a diagram for explaining a modification of the operation of the first step of the antenna arrangement method according to the first embodiment. It is assumed that the windshield 51 include a first colored portion 51x provided along the first side 51a having a band-like shape. That is, a case is assumed where the band-like first colored portion 51x is formed along the first side 51a having contact with the A pillar 53 of the automobile 50 of the four sides of the windshield 51 in the windshield 51.

In that case, as illustrated in FIG. 5, in the first step, at least a part of the transmission antenna 2 may be arranged on the side of the seat of the automobile 50 adjacent to the first colored portion 51x. That is, the transmission antenna 2 may be arranged in the automobile 50 so that at least a part of the transmission antenna 2 is covered with the first colored portion 51x and is hidden by the first colored portion 51x when the windshield 51 is viewed from the front side of the automobile 50 toward the windshield 51.

In a case where the windshield 51 includes the second colored portion provided along the second side 51b having a band-like shape, as in the first step, although not illustrated, at least a part of the reception antenna 3 may be arranged on the side of the seat of the automobile 50 adjacent to the second colored portion in the second step. That is, the reception antenna 3 may be arranged in the automobile 50 so that at least a part of the reception antenna 3 is covered with the second colored portion and is hidden by the second colored portion when the windshield 51 is viewed from the front side of the automobile 50 toward the windshield 51.

By adjusting the size of one or both of the transmission antenna 2 and the first colored portion 51x, in the first step, the entire transmission antenna 2 may be arranged on the side of the seat of the automobile 50 adjacent to the first colored portion 51x. By adjusting the size of one or both of the reception antenna 3 and the second colored portion, in the second step, the entire reception antenna 3 may be arranged on the side of the seat of the automobile 50 than the second colored portion.

Since substantially all the automobiles include the windshields, the transmission antenna 2 and the reception antenna 3 can be arranged on substantially all the windshields of the automobiles.

Figure 6:
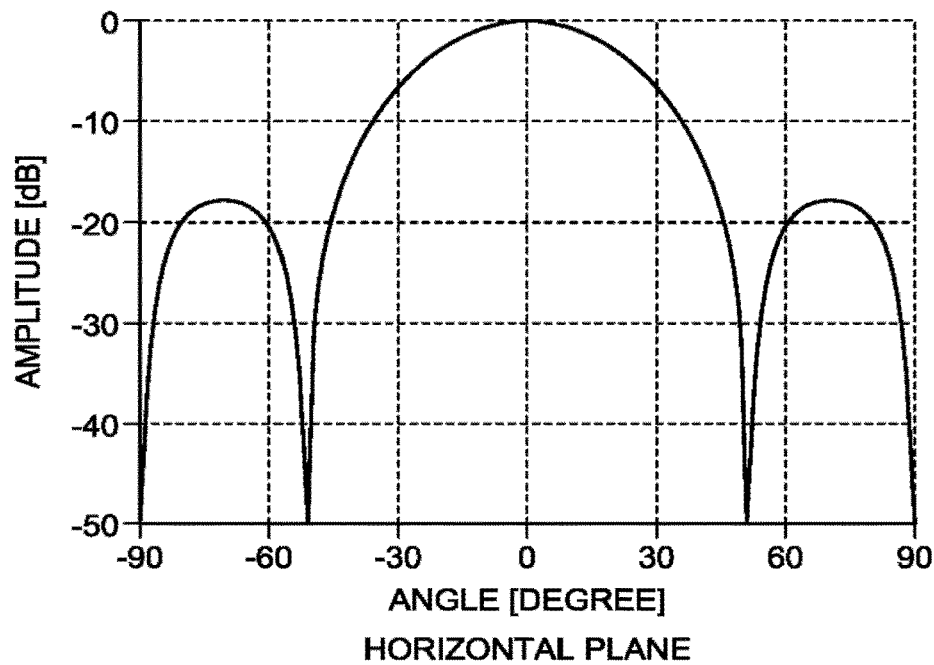
FIG. 6 is a diagram illustrating an example of a radiation pattern of a radio wave which is emitted in a horizontal direction by the transmission antenna included in the radar device according to the first embodiment.
Figure 7:
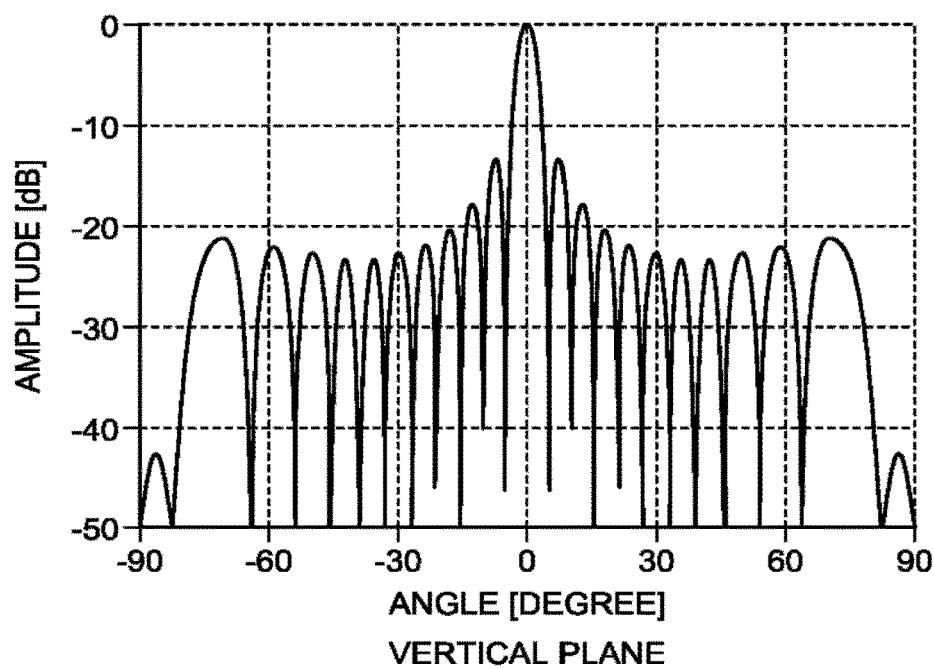
FIG. 7 is a diagram illustrating an example of a radiation pattern of a radio wave which is emitted in a vertical direction by the transmission antenna included in the radar device according to the first embodiment.

FIG. 6 is a diagram illustrating an example of a radiation pattern of a radio wave emitted in the horizontal direction by the transmission antenna 2 included in the radar device 1 according to the first embodiment. FIG. 7 is a diagram illustrating an example of a radiation pattern of a radio wave emitted in the vertical direction by the transmission antenna 2 included in the radar device 1 according to the first embodiment. For simple description, it is assumed to arrange the transmission antenna 2 in the automobile 50 so that the longitudinal direction of the transmission antenna 2 is the vertical direction in a case where the transmission antenna 2 is arranged in the automobile 50. In addition, it is assumed that a direction perpendicular to the surface of the transmission antenna 2 be 0°.

Since the horizontal direction corresponds to the short direction of the transmission antenna 2, a beam width of the radio wave emitted by the transmission antenna 2 is relatively wide. Since the vertical direction corresponds to the longitudinal direction of the transmission antenna 2, a beam width of the radio wave emitted by the transmission antenna 2 is relatively narrow. Since the transmission antenna 2 includes the single feeding unit 23, a radiation pattern is fixed. However, for example, by adjusting a dimension of the line 24, a radio wave having a radiation pattern directed toward a specific direction can be emitted from the transmission antenna 2.

In a case where the length Ly1 in the second direction y1 of the transmission antenna 2 is relatively short, even if the dimension of the length Lx1 in the longitudinal direction of the transmission antenna 2 is enlarged, the transmission antenna 2 can be arranged at a position inconspicuous from the inside and outside of the automobile 50 or a position invisible from the inside and the outside of the automobile 50.

Generally, in the antenna, an area and a gain are roughly proportional. If the area increases, an observable distance increases. Therefore, by enlarging the length Lx1 in the longitudinal direction of the transmission antenna 2, a performance of the transmission antenna 2 can be improved.

Figure 8:
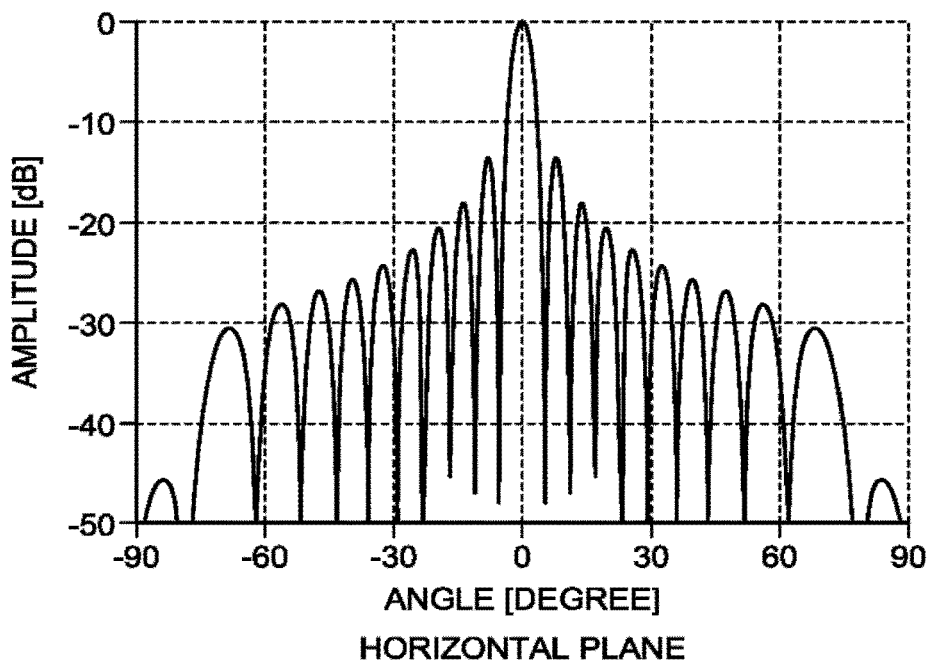
FIG. 8 is a diagram illustrating an example of a radiation pattern of a radio wave received in the horizontal direction by the reception antenna included in the radar device according to the first embodiment.
Figure 9:
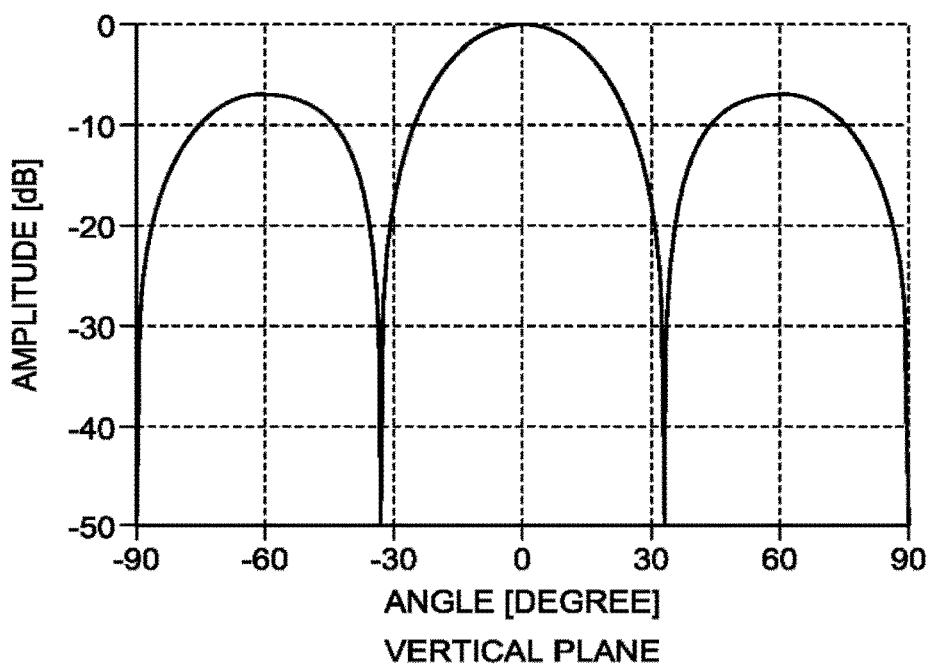
FIG. 9 is a diagram illustrating an example of a radiation pattern of a radio wave received in the vertical direction by the reception antenna included in the radar device according to the first embodiment.

FIG. 8 is a diagram illustrating an example of a radiation pattern of a radio wave received in the horizontal direction by the reception antenna 3 included in the radar device 1 according to the first embodiment. FIG. 9 is a diagram illustrating an example of a radiation pattern of a radio wave received in the vertical direction by the reception antenna 3 included in the radar device 1 according to the first embodiment. For simple description, it is assumed to arrange the reception antenna 3 in the automobile 50 so that the longitudinal direction of the reception antenna 3 is the horizontal direction in a case where the reception antenna 3 is arranged in the automobile 50. In addition, it is assumed that a direction perpendicular to the surface of the reception antenna 3 be 0°. It is further assumed that signals received at each channel of the reception antenna 3 be synthesized in phase. In this assumption, the reception antenna 3 is used to receive the radio wave having the radiation pattern in the horizontal direction.

Since the horizontal direction corresponds to the longitudinal direction of the reception antenna 3, a beam width of the radio wave received by the reception antenna 3 is relatively narrow. Since the vertical direction corresponds to the short direction of the reception antenna 3, a beam width of the radio wave received by the reception antenna 3 is relatively wide. Since the reception antenna 3 includes the plurality of channels, by synthesizing the signals of the plurality of channels in consideration of a phase difference, beam scanning on the horizontal plane can be performed.

In a case where the length Ly2 in the fourth direction y2 of the reception antenna 3 is relatively short, even if the dimension of the length Lx2 in the longitudinal direction of the reception antenna 3 is enlarged, the reception antenna 3 can be arranged at a position inconspicuous from the inside and the outside of the automobile 50 or a position almost invisible from the inside and the outside of the automobile 50.

Generally, in the antenna, an area and a gain are roughly proportional. If the area increases, an observable distance increases. Therefore, by enlarging the length Lx2 in the longitudinal direction of the reception antenna 3, a performance of the reception antenna 3 can be improved.

With reference to the signal received by the reception antenna 3, signal processing is executed for identifying a target. In the signal processing, a distance is obtained based on a time from a time when the radio wave is emitted to a time when reflected wave returns, a direction is obtained from the phase difference of the signals each corresponding to each of the plurality of channels of the reception antenna 3, and a relative speed is obtained from a frequency of the reflected wave.

By adjusting the beam of the vertical plane by the transmission antenna 2 and performing the beam scanning of the horizontal plane by the reception antenna 3, it is possible to control the directivities of both the vertical plane and the horizontal plane.

Figure 10:
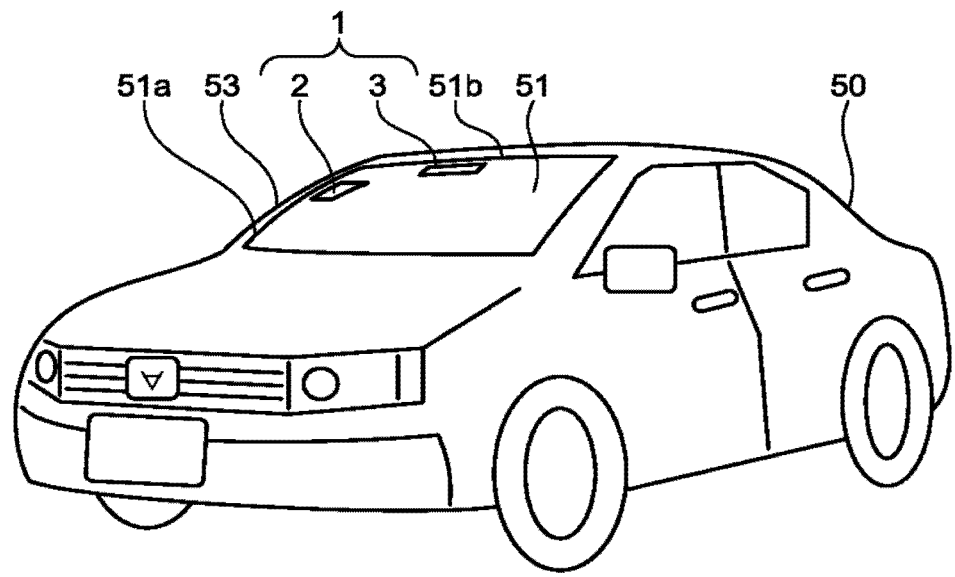
FIG. 10 is a diagram illustrating another example of the state where the radar device according to the first embodiment is arranged in the automobile.

As described with reference to FIG. 1, according to the antenna arrangement method according to the first embodiment, the transmission antenna 2 is arranged at the first portion of the automobile 50, and the reception antenna 3 is arranged at the second portion of the automobile 50. The second portion is different from the first portion. FIG. 10 is a diagram illustrating another example of a state where the radar device 1 according to the first embodiment is arranged in the automobile 50. As illustrated in FIG. 10, it is possible that the length in the longitudinal direction of each of the transmission antenna 2 and the reception antenna 3 is made to be shorter than the lengths illustrated in FIG. 1 and the transmission antenna 2 and the reception antenna 3 are arranged on the windshield 51 as setting a distance between the transmission antenna 2 and the reception antenna 3 to be wider than the distance illustrated in FIG. 1.

In consideration of synchronization between transmission and reception of signals, a clock signal and a timing signal for detecting waves on the side of the reception, and transmission of a high-frequency signal to be transmitted, the transmission antenna 2 and the reception antenna 3 may be connected with a cable. The transmission antenna 2 and the reception antenna 3 may be integrated.

Up to this point, with reference to FIGS. 1 and 10, an example has been described in which the transmission antenna 2 and the reception antenna 3 are arranged on the windshield 51 of the automobile 50. The transmission antenna 2 may be arranged along the second side 51b, not the first side 51a, and the reception antenna 3 may be arranged along the first side 51a, not the second side 51b.

Figure 11:
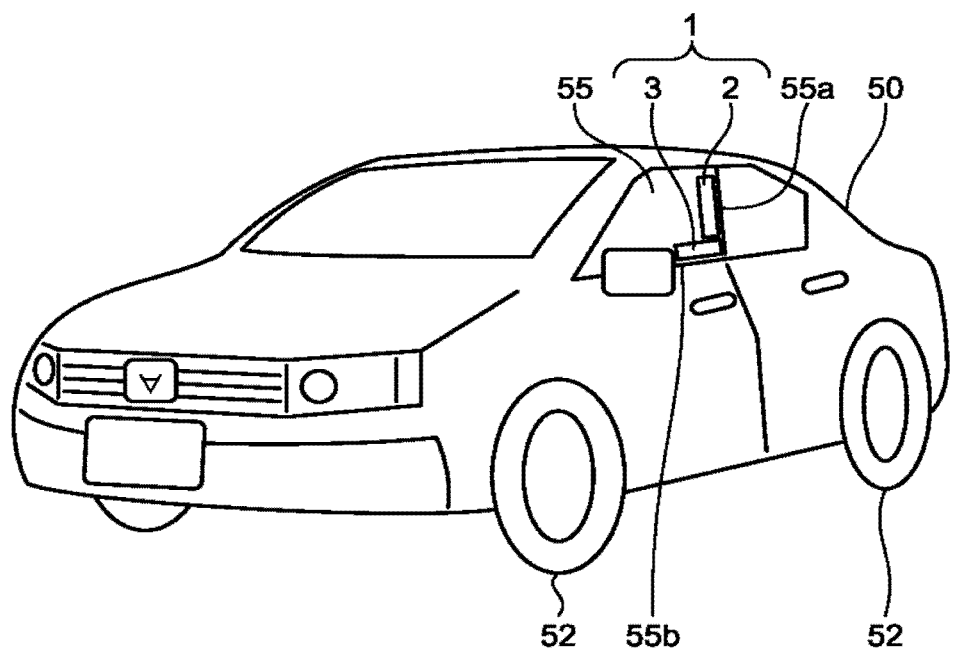
FIG. 11 is a diagram illustrating still another example of the state where the radar device according to the first embodiment is arranged in the automobile.

The transmission antenna 2 and the reception antenna 3 may be arranged in a portion other than the windshield 51 of the automobile 50. FIG. 11 is a diagram illustrating still another example of the state where the radar device 1 according to the first embodiment is arranged in the automobile 50. As illustrated in FIG. 11, in the first step, the transmission antenna 2 may be arranged along a first side 55a of a window 55 of the automobile 50, and in the second step, the reception antenna 3 may be arranged along a second side 55b of the window 55. Here, the second side 55b is different from the first side 55a, the first direction x1 is parallel to the first side 55a of the window 55, and the third direction x2 is parallel to the second side 55b of the window 55. In the first step, the transmission antenna 2 may be arranged along the second side 55b of the window 55, and in the second step, the reception antenna 3 may be arranged along the first side 55a of the window 55. The first side 55a is a side positioned along the vertical direction in a case where the tires 52 included in the automobile 50 have contact with the ground. The second side 55b is a side positioned along the horizontal direction in a case where the tires 52 have contact with the ground.

Figure 12:
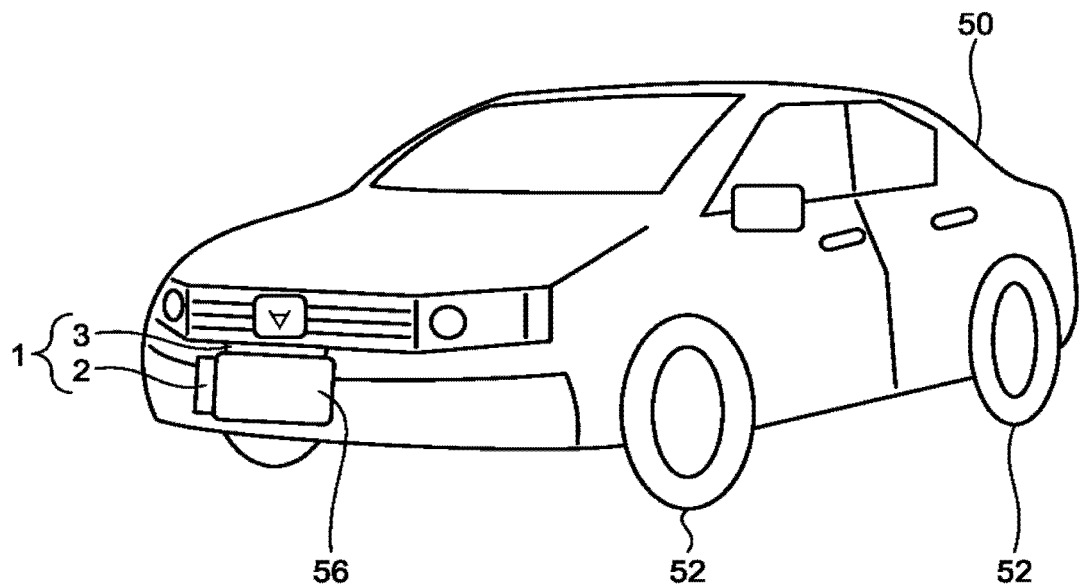
FIG. 12 is a diagram illustrating yet another example of the state where the radar device according to the first embodiment is arranged in the automobile.

FIG. 12 is a diagram illustrating yet another example of the state where the radar device 1 according to the first embodiment is arranged in the automobile 50. As illustrated in FIG. 12, in the first step, the transmission antenna 2 may be arranged along a single side of a license plate 56 included in the automobile 50, and in the second step, the reception antenna 3 may be arranged along another side of the license plate 56. In the first step, the transmission antenna 2 may be arranged along the another side of the license plate 56, and in the second step, the reception antenna 3 may be arranged along the single side of the license plate 56. The single side is positioned along the vertical direction in a case where the tires 52 included in the automobile 50 have contact with the ground. The another side is positioned along the horizontal direction in a case where the tires 52 have contact with the ground.

Figure 13:
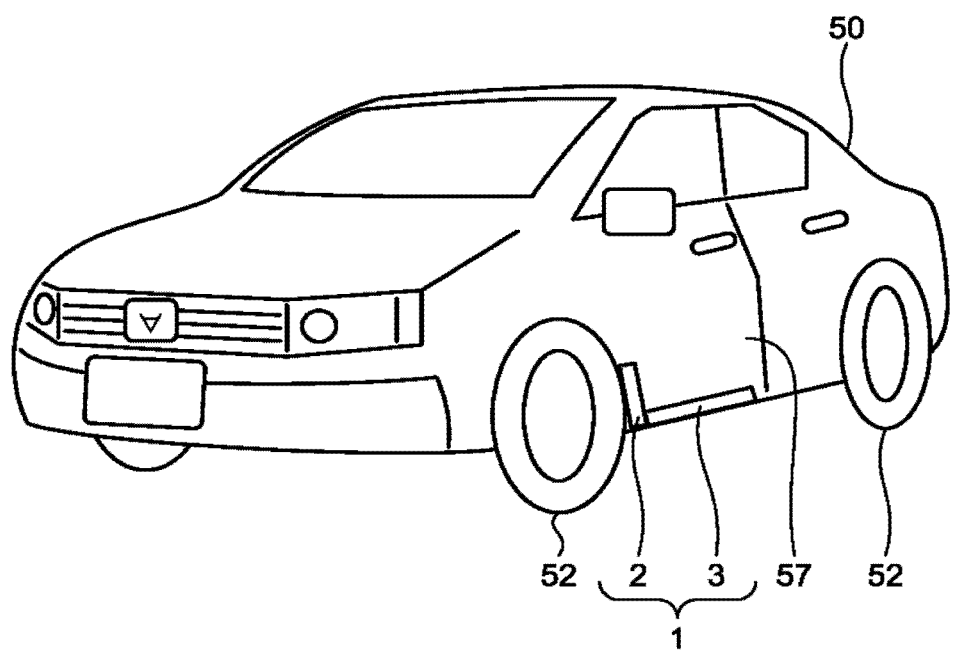
FIG. 13 is a diagram illustrating still yet another example of the state where the radar device according to the first embodiment is arranged in the automobile.

FIG. 13 is a diagram illustrating still yet another example of the state where the radar device 1 according to the first embodiment is arranged in the automobile 50. As illustrated in FIG. 13, in the first step, the transmission antenna 2 may be arranged along a single side of a door 57 included in the automobile 50, and in the second step, the reception antenna 3 may be arranged along another side of the door 57. In the first step, the transmission antenna 2 may be arranged along the another side of the door 57, and in the second step, the reception antenna 3 may be arranged along the single side of the door 57. The single side is positioned along the vertical direction in a case where the tires 52 included in the automobile 50 have contact with the ground. The another side is positioned along the horizontal direction in a case where the tires 52 have contact with the ground. In a case where an outline of the structure of the automobile 50 is a curved line, an outer shape of an antenna surface of each of the transmission antenna 2 and the reception antenna 3 is formed to be curved, and the transmission antenna 2 and the reception antenna 3 may be arranged along the outline of the structure of the automobile 50.

Figure 14:
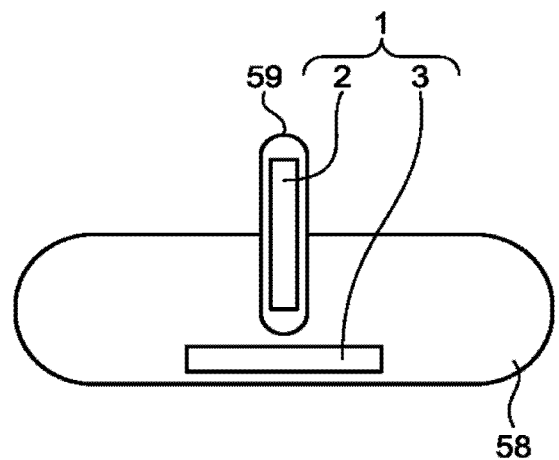
FIG. 14 is a diagram illustrating still another example of the state where the radar device according to the first embodiment is arranged in the automobile.

FIG. 14 is a diagram illustrating still another example of the state where the radar device 1 according to the first embodiment is arranged in the automobile 50. As illustrated in FIG. 14, in the first step, the transmission antenna 2 may be arranged in a part of a support 59 supporting a rearview mirror 58 included in the automobile 50, and in the second step, the reception antenna 3 may be arranged in a part of the rearview mirror 58. In the first step, the transmission antenna 2 may be arranged in a part of the rearview mirror 58, and in the second step, the reception antenna 3 may be arranged in a part of the support 59. In this way, one or both of the first portion where the transmission antenna 2 is arranged and the second portion where the reception antenna 3 is arranged may be a part of the support 59 supporting the rearview mirror 58 included in the automobile 50 or a part of the rearview mirror 58.

Figure 15:
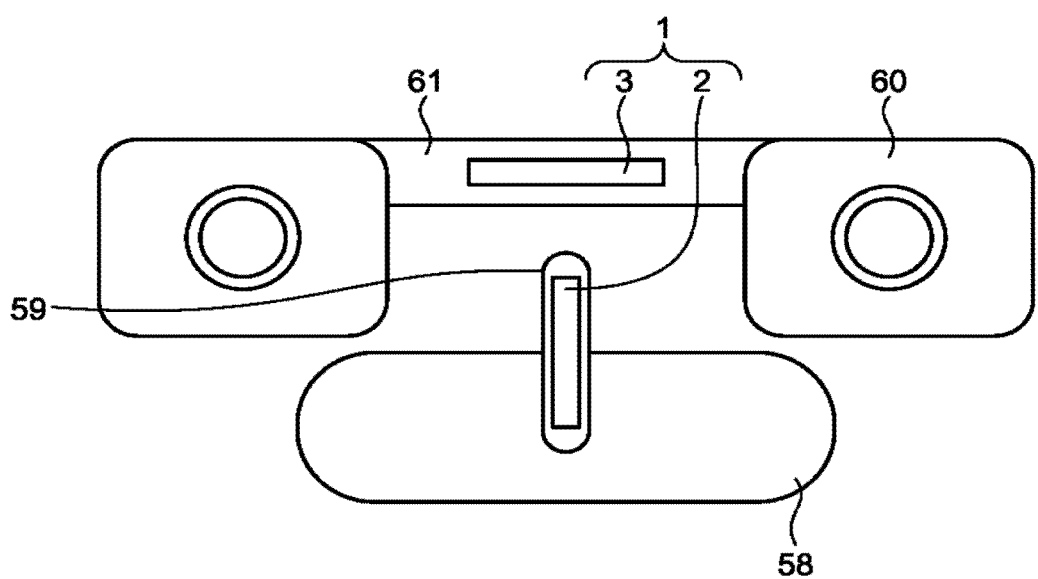
FIG. 15 is a diagram illustrating yet another example of the state where the radar device according to the first embodiment is arranged in the automobile.

FIG. 15 is a diagram illustrating yet another example of the state where the radar device 1 according to the first embodiment is arranged in the automobile 50. As illustrated in FIG. 15, in the first step, the transmission antenna 2 may be arranged in a part of the support 59 supporting the rearview mirror 58 included in the automobile 50, and in the second step, the reception antenna 3 may be arranged in a part of a stereo camera 61 that is a part of a collision prevention device 60 mounted on the automobile 50. In the first step, the transmission antenna 2 may be arranged in a part of the stereo camera 61, and the reception antenna 3 may be arranged in a part of the support 59. In this way, one or both of the first portion where the transmission antenna 2 is arranged and the second portion where the reception antenna 3 is arranged may be a part of a camera which is a part of the collision prevention device 60 mounted on the automobile 50.

In any case, the antenna arrangement method according to the first embodiment includes the first step of arranging the transmission antenna 2 at the first portion of the automobile 50 and the second step of arranging the reception antenna 3 at the second portion of the automobile 50. The second portion is different from the first portion. Each of the first portion and the second portion may be a part of the outer periphery of one component of the automobile 50 or a bent portion of one component of the automobile 50.

As described above, the radar device 1 according to the first embodiment includes the transmission antenna 2 and the reception antenna 3 which is a structure different from the transmission antenna 2. The transmission antenna 2 is an antenna having a longitudinal direction and a short direction. The reception antenna 3 is an antenna having a longitudinal direction and a short direction. Therefore, one or both of the length in the longitudinal direction of the transmission antenna 2 and the length in the short direction of the transmission antenna 2 are adjusted and one or both of the length in the longitudinal direction of the reception antenna 3 and the length in the short direction of the reception antenna 3 are adjusted so that the radar device 1 can be arranged in the automobile 50 without limiting the place.

In addition, for example, by arranging each of the transmission antenna 2 and the reception antenna 3 along any one of the four sides of the windshield 51 of the automobile 50, it is possible to prevent deterioration in the design and the aesthetic appearance of the automobile 50.

Two or more transmission antennae 2 may be arranged in the automobile 50 without being overlapped with each other, and two or more reception antennae 3 may be arranged in the automobile 50 without being overlapped with each other. Furthermore, the transmission antenna 2 may be used to emit the radio wave having the radiation pattern in the vertical direction, and the reception antenna 3 may be used to receive the radio wave having the radiation pattern in the horizontal direction.

The radar device 1 includes a signal processing circuit which executes processing on a signal corresponding to the radio wave emitted by the transmission antenna 2 and processing on a signal corresponding to the radio wave received by the reception antenna 3. The signal processing circuit is not illustrated in FIGS. 2 and 3. A part of the signal processing circuit is provided in the transmission antenna 2. For example, a part of the signal processing circuit is provided on the other surface of the transmission dielectric substrate 22 of the transmission antenna 2. The other surface of the transmission dielectric substrate 22 is a plane of two planes of the transmission dielectric substrate 22 where the transmission element antennae 21 are not arranged. The remaining part of the signal processing circuit is provided in the reception antenna 3. For example, the remaining part of the signal processing circuit is provided on the other surface of the reception dielectric substrate 32 of the reception antenna 3. The other surface of the reception dielectric substrate 32 is a surface of two planes of the reception dielectric substrate 32 where the reception element antenna 31 is not arranged.

Second Embodiment

Figure 16:
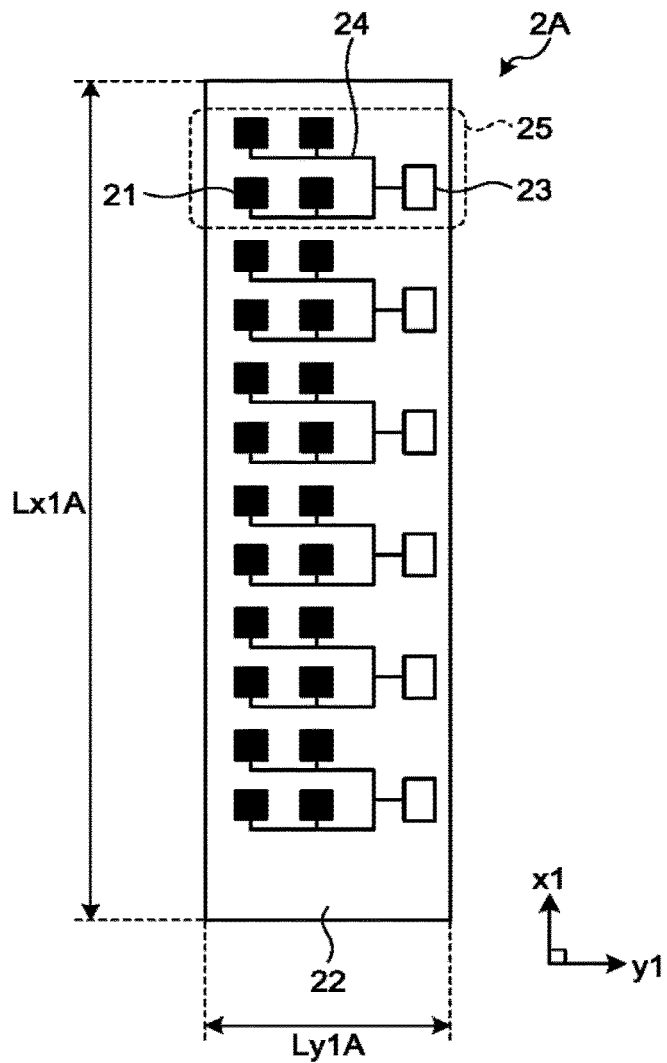
FIG. 16 is a plan view of a transmission antenna included in a radar device according to a second embodiment.

FIG. 16 is a plan view of a transmission antenna 2A included in a radar device according to a second embodiment. The radar device according to the second embodiment includes the transmission antenna 2A instead of the transmission antenna 2 of the radar device 1 according to the first embodiment. A difference between the second embodiment and the first embodiment is that the radar device according to the second embodiment includes the transmission antenna 2A instead of the transmission antenna 2. In the second embodiment, the difference from the first embodiment will be mainly described.

The transmission antenna 2A includes the plurality of transmission element antennae 21 and the transmission dielectric substrate 22 where the plurality of transmission element antennae 21 is positioned. The plurality of transmission element antennae 21 is arranged on one of two planes of the transmission dielectric substrate 22 to be positioned on the transmission dielectric substrate 22. Each of the plurality of transmission element antennae 21 is a patch antenna.

A shape of the plane of the transmission dielectric substrate 22 is a rectangle of which a length Lx1A in the first direction x1 is longer than a length Ly1A in the second direction y1. The second direction y1 is orthogonal to the first direction x1. That is, the length Lx1A in the first direction x1 of the transmission antenna 2A is longer than the length Ly1A in the second direction y1 of the transmission antenna 2A. That is, the transmission antenna 2A is an antenna having a longitudinal direction and a short direction.

The length Lx1A in the first direction x1 of the transmission antenna 2A is, for example, several 10 mm to several 100 mm. The length Ly1A in the second direction y1 of the transmission antenna 2A is, for example, several mm to several 10 mm.

The transmission antenna 2A further includes the plurality of feeding units 23 that outputs a high-frequency signal and the line 24 that connects each of the plurality of feeding units 23 and the plurality of transmission element antennae 21. The line 24 is a microstrip line. A group 25 including a single feeding unit 23 and the plurality of transmission element antennae 21 connected to the single feeding unit 23 with a part of the line 24 is defined as a unit of a single channel. In FIG. 16, the single group 25 is surrounded by a broken line.

Since the transmission antenna 2A includes the plurality of feeding units 23, the transmission antenna 2A has a plurality of channels. A difference between the second embodiment and the first embodiment is that the radar device according to the second embodiment includes the transmission antenna 2A instead of the transmission antenna 2. For example, the transmission antenna 2A is arranged in the automobile 50 so that the longitudinal direction of the transmission antenna 2A is arranged along the first side 51a of the windshield 51 of the automobile 50 in FIG. 1. In that case, by using the phase difference of the radio waves emitted by the transmission element antennae 21 each corresponding to the plural channels, beam scanning in the vertical direction can be performed.

Similarly to the radiation pattern of the transmission antenna 2 according to the first embodiment, an example of the radiation pattern of the radio wave emitted by the transmission antenna 2A according to the second embodiment in the horizontal direction is as illustrated in FIG. 6, and an example of the radiation pattern of the radio wave emitted by the transmission antenna 2A in the vertical direction is as illustrated in FIG. 7. However, unlike the transmission antenna 2, the transmission antenna 2A has the plurality of channels. Therefore, if the transmission antenna 2A is used, beam scanning on the vertical plane can be performed by adding a phase difference to a signal corresponding to each channel.

The radar device according to the second embodiment includes the transmission antenna 2A including the plurality of channels and the reception antenna 3 including the plurality of channels. Beam scanning on the vertical plane is performed by the transmission antenna 2A and beam scanning on the horizontal plane is performed by the reception antenna 3 so that directivities of both the vertical plane and the horizontal plane can be controlled. That is, a position of the target in the vertical direction can be estimated by the beam scanning in the vertical direction by the transmission antenna 2A, and a position of the target in the horizontal direction can be estimated by beam scanning in the horizontal direction by the reception antenna 3. As a result, an angle of the target with respect to the front direction of the automobile 50 can be estimated.

The radiation pattern of the transmission antenna 2A can be controlled by changing the phase of the radio wave emitted by each of the plurality of channels of the transmission antenna 2A. The radio wave from the plurality of channels of the transmission antenna 2A may be emitted in a time division manner. In that case, after the reception antenna 3 has received the radio wave, a plurality of digital signals corresponding to the received radio waves can be synthesized. Each of the plurality of channels of the transmission antenna 2A may emit the radio wave having a different code. In that case, after the reception antenna 3 has received the radio wave, a signal corresponding to each channel can be separated based on the code.

Figure 17:
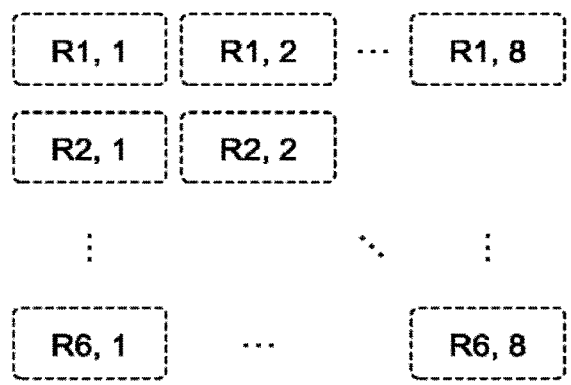
FIG. 17 is a diagram illustrating an example of a virtual two-dimensional planar antenna.

Since the positions of the plurality of channels of the transmission antenna 2A in FIG. 16 are different from each other, the phase of the radio wave is different for each direction of the radio wave emitted by the transmission antenna 2A. Therefore, a phase of the signal corresponding to each radio wave received by the reception antenna 3 is different for each channel of the transmission antenna 2A. That is, a signal equivalent to a signal in a case where the signal is received by a virtual two-dimensional planar antenna illustrated in FIG. 17 is obtained from the radio wave received by the reception antenna 3. FIG. 17 is a diagram illustrating an example of the virtual two-dimensional planar antenna.

In FIG. 17, each portion surrounded by a broken line represents a virtual channel. A label "Rm, n" using a natural number m and a natural number n is allocated to each channel. The natural number m in the label "Rm, n" indicates the number of a transmission channel of an actual antenna, and the natural number n in the label "Rm, n" indicates the number of a reception channel of the actual antenna.

A virtual reception antenna in a first row in FIG. 17 indicates an antenna in a case where a signal from the uppermost channel of the transmission antenna 2A is received by the reception antenna 3, and a virtual reception antenna in a second row indicates an antenna in a case where a signal from a second channel from the top of the transmission antenna 2A is received by the reception antenna 3. The same applies below. An angle of the reflected wave is estimated by multiplying a phase forming a beam in an arbitrary direction relative to a signal corresponding to the virtual two-dimensional planar antenna in FIG. 17. Since element antennae are virtually and two-dimensionally arranged, an oblique beam is formed in addition to the beams on the horizontal plane and the vertical plane.

Third Embodiment

Figure 18:
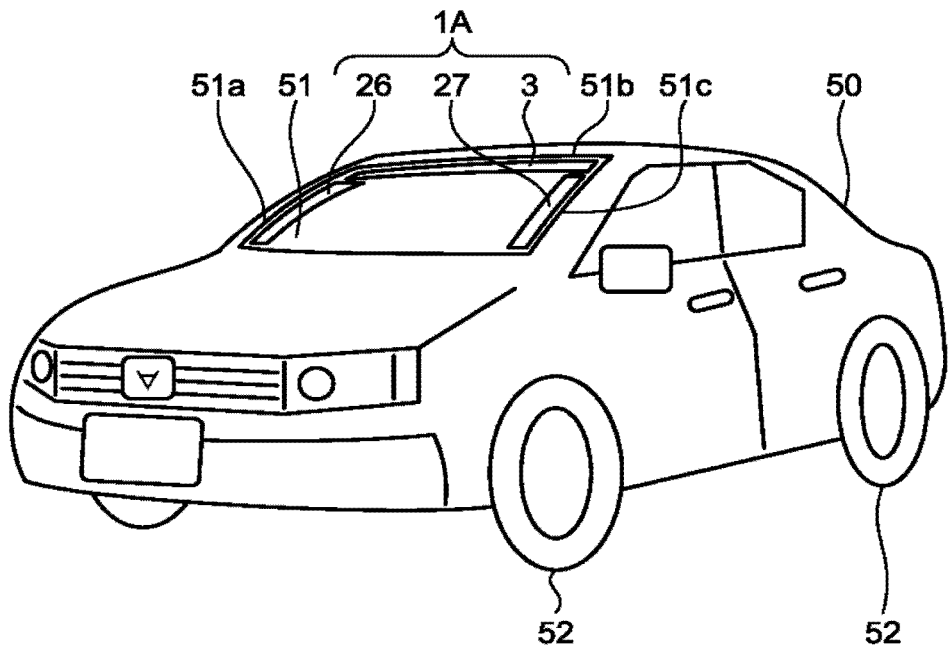
FIG. 18 is a diagram illustrating an example of a state where a radar device according to a third embodiment is arranged in an automobile.

FIG. 18 is a diagram illustrating an example of a state where a radar device 1A according to a third embodiment is arranged in the automobile 50. As illustrated in FIG. 18, the radar device 1A includes a first transmission antenna 26, the reception antenna 3 which is a structure different from the first transmission antenna 26, and a second transmission antenna 27 which is a structure different from the first transmission antenna 26 and the reception antenna 3. FIG. 18 illustrates a state where the first transmission antenna 26, the reception antenna 3, and the second transmission antenna 27 included in the radar device 1A are arranged on the windshield 51 of the automobile 50.

Each of the first transmission antenna 26 and the second transmission antenna 27 is the same as the transmission antenna 2A described in the second embodiment. The reception antenna 3 is the reception antenna 3 described in the first embodiment. That is, each of the first transmission antenna 26, the second transmission antenna 27, and the reception antenna 3 has the longitudinal direction and the short direction.

As illustrated in FIG. 18, the windshield 51 of the automobile 50 has four sides. One of two sides, which are not parallel to the horizontal plane when the tires 52 included in the automobile 50 have contact with the ground, of the four sides is defined as the first side 51a. The other side of the two sides is defined as a third side 51c.

One of two sides, parallel to the horizontal plane when the tires 52 included in the automobile 50 have contact with the ground, of the four sides is defined as a second side 51b. The second side 51b is an upper side of the two sides parallel to the horizontal plane when the tires 52 have contact with the ground. The second side 51b is orthogonal to the first side 51a and the third side 51c. Note that "orthogonal" does not mean strict orthogonality and means that the second side 51b is not parallel to the first side 51a.

An antenna arrangement method according to the third embodiment includes a first step of arranging the first transmission antenna 26 along the first side 51a of the windshield 51 of the automobile 50, a second step of arranging the reception antenna 3 along the second side 51b of the windshield 51, and a third step of arranging the second transmission antenna 27 along the third side 51c of the windshield 51 of the automobile 50.

In any step, as in the antenna arrangement method according to the first embodiment, the first transmission antenna 26, the reception antenna 3, and the second transmission antenna 27 are arranged on the windshield 51. For example, the first transmission antenna 26, the reception antenna 3, and the second transmission antenna 27 are arranged on a surface of two surfaces of the windshield 51 closer to the seat. In the first step, the first direction x1 of the first transmission antenna 26 is parallel to the first side 51a. In the second step, the third direction x2 of the reception antenna 3 is parallel to the second side 51b. In the third step, the first direction x1 of the second transmission antenna 27 is parallel to the third side 51c.

Operations in the first step, the second step, and the third step may be performed in any order.

One or both of the length in the longitudinal direction of the first transmission antenna 26 and the length in the short direction of the first transmission antenna 26 are adjusted, one or both of the length in the longitudinal direction of the reception antenna 3 and the length in the short direction of the reception antenna 3 are adjusted, and one or both of the length in the longitudinal direction of the second transmission antenna 27 and the length in the short direction of the second transmission antenna 27 are adjusted so that the radar device 1A can be arranged in the automobile 50 without limiting the place.

In addition, by arranging each of the first transmission antenna 26, the reception antenna 3, and the second transmission antenna 27 in a place described with reference to FIG. 18, the first transmission antenna 26, the reception antenna 3, and the second transmission antenna 27 can be arranged in the automobile 50 without deteriorating the design and the aesthetic appearance of the automobile 50.

Figure 19:
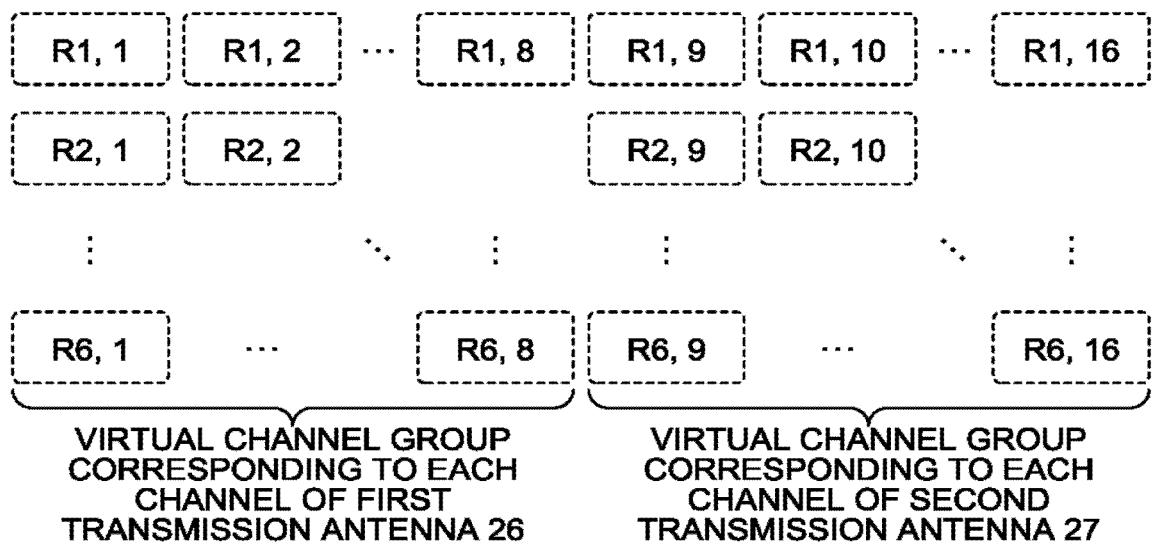
FIG. 19 is a diagram illustrating an example of a virtual two-dimensional planar antenna.

Since the radar device 1A includes the first transmission antenna 26 and the second transmission antenna 27, the reception antenna 3 obtains a signal equivalent to a signal, for example, in case where a signal is received by the virtual two-dimensional planar antenna illustrated in FIG. 19. FIG. 19 is a diagram illustrating an example of the virtual two-dimensional planar antenna. In FIG. 19, each portion surrounded by a broken line represents a virtual channel. The label "Rm, n" using the natural number m and the natural number n is allocated to each channel.

The natural number m in the label "Rm, n" indicates the number of a transmission channel of an actual antenna, and the natural number n in the label "Rm, n" indicates the number of a reception channel of the actual antenna. Each channel in a case where the natural number n is equal to or more than one and equal to or less than eight is a virtual channel corresponding to any one of the channels of the first transmission antenna 26, and each channel in a case where the natural number n is equal to or more than nine and equal to or less than 16 is a virtual channel corresponding to any one of the channels of the second transmission antenna 27.

Since the first transmission antenna 26 and the second transmission antenna 27 are arranged with a space therebetween in the horizontal direction, the virtual two-dimensional planar antenna in FIG. 19 is an antenna formed by enlarging the virtual two-dimensional planar antenna in FIG. 17 in the horizontal direction. Since the size of the antenna and the beam width are inversely proportional to each other, according to an antenna arrangement method according to the third embodiment, a resolution when the target is detected is more improved than a resolution at the time when the target is detected in a case where only the transmission antenna 2 is arranged.

It is possible that the first transmission antenna 26 and the second transmission antenna 27 are arranged in the automobile 50 so that the longitudinal directions of the first transmission antenna 26 and the second transmission antenna 27 are the horizontal direction, and it is possible that the reception antenna 3 is arranged in the automobile 50 so that the longitudinal direction of the reception antenna 3 is the vertical direction.

The place where each of the first transmission antenna 26, the reception antenna 3, and the second transmission antenna 27 is arranged is not limited to the place described with reference to FIG. 18. It is preferable that the first transmission antenna 26, the reception antenna 3, and the second transmission antenna 27 be each arranged in three places of a plurality of places of the automobile 50 without being overlapped with each other.

Three or more first transmission antennae 26 may be arranged in the automobile 50, and two or more reception antennae 3 may be arranged in the automobile 50.

Fourth Embodiment

Figure 20:
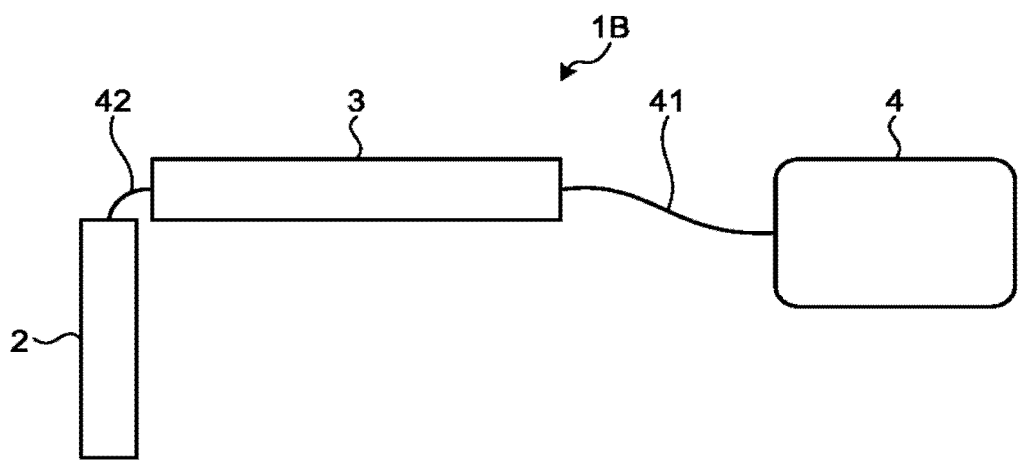
FIG. 20 is a diagram illustrating a configuration of a radar device according to a fourth embodiment.

FIG. 20 is a diagram illustrating a configuration of a radar device 1B according to a fourth embodiment. The radar device 1B includes the transmission antenna 2, the reception antenna 3, and a signal processing circuit 4 which is a structure different from the transmission antenna 2 and the reception antenna 3. The signal processing circuit 4 executes the processing on a signal corresponding to the radio wave emitted by the transmission antenna 2 and the processing on a signal corresponding to the radio wave received by the reception antenna 3. The radar device 1B further includes a first connection line 41 that connects the signal processing circuit 4 and the reception antenna 3 and a second connection line 42 that connects the reception antenna 3 and the transmission antenna 2. The transmission antenna 2 is the transmission antenna 2 described in the first embodiment. The reception antenna 3 is the reception antenna 3 described in the first embodiment.

The signal processing circuit 4 generates a signal that is a source of the radio wave emitted by the transmission antenna 2. In addition, the signal processing circuit 4, for example, executes a part or all of amplification of the signal corresponding to the radio wave received by the reception antenna 3, frequency conversion of the signal, and analog-digital conversion of the signal. Furthermore, the signal processing circuit 4 extracts a signal necessary for identifying the target from the signal obtained by digitizing the radio wave received by the reception antenna 3 to identify the target.

As described above, the signal processing circuit 4 is a structure different from both of the transmission antenna 2 and the reception antenna 3. Therefore, the signal processing circuit 4 can be arranged at a third portion, different from the first portion where the transmission antenna 2 is arranged and the second portion where the reception antenna 3 is arranged, of the plurality of portions of the automobile 50. By selecting the third portion which does not deteriorate the design and the aesthetic appearance of the automobile 50 when the signal processing circuit 4 is arranged in the third portion of the automobile 50, the signal processing circuit 4 can be arranged in the automobile 50 without deteriorating the design and the aesthetic appearance of the automobile 50.

Since the transmission antenna 2 transmits the radio wave to the target and the reception antenna 3 receives the radio wave from the target, the signal processing circuit 4 does not directly contribute to the transmission and reception of the radio wave. Therefore, the signal processing circuit 4 can be arranged at an arbitrary position in the automobile 50. As described above, since the signal processing circuit 4 is a structure different from both of the transmission antenna 2 and the reception antenna 3, the sizes of the transmission antenna 2 and the reception antenna 3 can be reduced than the sizes in a case where a part of the signal processing circuit 4 is provided in the transmission antenna 2 and the remaining part of the signal processing circuit 4 is provided in the reception antenna 3. The transmission antenna 2 may be replaced with the transmission antenna 2A described in the second embodiment.

The structures illustrated in the above embodiments indicate exemplary contents of the present invention and can be combined with other known technique. Furthermore, the configuration illustrated in the embodiments can be partially omitted or changed without departing from the scope of the present invention.

REFERENCE SIGNS LIST 1 radar device; 2, 2A transmission antenna; 3 reception antenna; 21 transmission element antenna; 22 transmission dielectric substrate; 23 feeding unit; 24, 34 line; 25, 35 group; 31 reception element antenna; 32 reception dielectric substrate; 33 reception unit; 50 automobile; 51 windshield.

The invention claimed is:

1. A radar device comprising:
a transmission antenna including a plurality of transmission element antennae;
a reception antenna, including a plurality of reception element antennae, having a structure different from the transmission antenna; and
a signal processing circuit to execute processing on a signal corresponding to a radio wave emitted by the transmission antenna and processing on a signal corresponding to a radio wave received by the reception antenna, wherein
the transmission antenna further includes a transmission dielectric substrate where the plurality of transmission element antennae is arranged in a first direction, a length in the first direction is longer than a length in a second direction orthogonal to the first direction, and the transmission antenna includes a plurality of channels and performs beam scanning on a vertical plane,
the reception antenna further includes a reception dielectric substrate where the plurality of reception element antennae is arranged in a third direction, a length in the third direction is longer than a length in a fourth direction orthogonal to the third direction, the third direction is orthogonal to the first direction, and the reception antenna includes a plurality of channels and performs beam scanning on a horizontal plane,
each of the transmission antenna and the reception antenna includes a plurality of channels, a two-dimensional planar antenna includes a combination of the channels of the transmission antenna and the channels of the reception antenna and is mounted on an automobile, and the transmission dielectric substrate and the reception dielectric substrate are separated from each other by a signal line connecting between the transmission antenna and the reception antenna and are arranged on a windshield, and the transmission dielectric substrate is orthogonal to the reception dielectric substrate.

2. The radar device according to claim 1, wherein
the transmission antenna is arranged along a first side of the windshield of the automobile, and the first direction is parallel to the first side, and
the reception antenna is arranged along a second side of the windshield, the third direction is parallel to the second side, and the second side is orthogonal to the first side.

3. The radar device according to claim 2, wherein
the windshield includes a first colored portion provided along the first side and a second colored portion provided along the second side,
the transmission antenna is arranged on a seat side of the automobile than the first colored portion, and
the reception antenna is arranged on the seat side of the automobile than the second colored portion.

4. The radar device according to claim 1, wherein
the transmission antenna is arranged at a first portion of the automobile,
the reception antenna is arranged at a second portion of the automobile, and
one or both of the first portion and the second portion is a part of an outer periphery of one component of the automobile or a bent portion of the component.

5. The radar device according to claim 1, wherein
the transmission antenna is arranged at a first portion of the automobile,
the reception antenna is arranged at a second portion of the automobile, and
one or both of the first portion and the second portion is a part of a support supporting a rearview mirror included in the automobile or a part of the rearview mirror.

6. The radar device according to claim 1, wherein
the transmission antenna is arranged at a first portion of the automobile,
the reception antenna is arranged at a second portion of the automobile, and
one or both of the first portion and the second portion is a part of a camera that is a part of a collision prevention device mounted on the automobile.

7. The radar device according to claim 1, wherein
the transmission antenna is arranged at a first portion of the automobile,
the reception antenna is arranged at a second portion of the automobile, and
one or both of two or more of the transmission antennae and the reception antennae are arranged in the automobile.

8. The radar device according to claim 1, wherein
the signal processing circuit that is a structure different from the transmission antenna and the reception antenna is arranged in the automobile.

* * * * *